United States Patent Office 3,636,142
Patented Jan. 18, 1972

3,636,142
TRIORTHOPHOSPHATE ESTERS OF
ETHOXYLATED TRIOLS
William G. De Pierri, Jr., Baytown, Tex., assignor to
Esso Research and Engineering Company
No Drawing. Filed Apr. 4, 1968, Ser. No. 718,906
Int. Cl. C02b 5/06; C07f 9/08
U.S. Cl. 260—929     17 Claims

ABSTRACT OF THE DISCLOSURE

Triorthophosphate ester of ethoxylated triols having from 3 to 20 carbon atoms and 2 to 50 moles of ethylene oxide. The alkali metal and ammonium salts of said ester may be used to inhibit the deposition of water insoluble salts in aqueous system such as subsurface formations containing brine.

BACKGROUND OF THE INVENTION

(1) Field of the invention

The present invention is directed to inhibition of the deposition of water insoluble salts from aqueous systems containing them. More particularly, the invention is concerned with the inhibition of water insoluble salts from brines and the like in and produced from subsurface formations. In its more specific aspects, the present invention is concerned with a new and improved inhibitor for water insoluble salts and the use thereof.

(2) Description of the prior art

A problem exists in oil wells and aqueous systems by precipitation of water insoluble salts such as but not limited to calcium sulfate, barium sulfate, strontium sulfate, calcium carbonate, strontium carbonate, magnesium carbonate and the like. Insoluble salts of iron also give difficulty particularly in oil wells; calcium sulfate precipitation sometimes called "gyp" causes detrimental effects in that it plugs the producing formations, collects on rods and tubing inside the well, and plugs pumps and flowlines. The removal of this hard "gyp" deposit is an expensive and time-consuming job, and much effort has heretofore been expanded in looking for and using inhibitors which would reduce deposition of "gyp" and other water insoluble salts.

The problem is not simple in that suitable inhibitors heretofore used have not been successful. A suitable inhibitor must have other properties besides inhibition to be used in accordance with the present invention. The inhibitor must be soluble or dispersible in the field fluids. It must be sufficiently active to be economically effective. It should not be corrosive to oil well tubing and the like and, lastly, it should not increase the difficulty of breaking any emulsions which might occur in the produced fluids.

Moreover, in certain applications to oil wells it is desirable and necessary to introduce the inhibitor into a formation containing the water insoluble salts and deposit the inhibitor therein by a so-called squeeze technique. In this operation, the inhibitor in relatively concentrated form is pressured into the producing formation where it is adsorbed upon the surfaces of the rock constituting the formation. Thereafter, the inhibitor is desorbed from the formation with the produced fluids which comprise oil and water and gas. The desorbed inhibitor then prevents scale formation by preventing deposition of the water insoluble salts from the production fluids. The inhibitor's presence in water and brine effectively prevents scale formation in the produced fluids; therefore, inhibition prevents blocking of the pores of the formation and prevents deposition on ferrous metal surfaces such as the inner walls of tubing and well conduits.

Additionally, for an inhibitor to be useful in such a squeeze application, the adsorption-desorption characteristics must be properly balanced. It is essential that the adsorption be sufficiently strong such that the rock retains a reasonable amount of the inhibitor. It must be sufficiently weak to allow the desorption of the inhibitor to occur to the extent that an effective concentration of the inhibitor is maintained in the produced fluids. Likewise, it is necessary that the presence of the inhibitor in the produced fluids must be detectable since otherwise the level of the inhibitor cannot be controlled, making it difficult if not impossible to decide when the squeeze treatment should be repeated. In accordance with the present invention, inhibitors are provided which prevent precipitation and deposition of scale is effectively controlled and/or prevented.

Specific prior art considered with respect to this invention include the following listed U.S. patents:

| | |
|---|---|
| 2,128,161 | 3,283,817 |
| 3,213,017 | 3,288,217 |
| 3,258,071 | 3,304,349 |
| 3,258,428 | 3,308,161 |
| 3,271,306 | 3,336,221 |

SUMMARY OF THE INVENTION

The present invention may be briefly described and illustrated as a triorthophosphate ester of an ethoxylated triol wherein the triol has from 3 to 10 carbon atoms and wherein the ester is the 2 to 50 mole ethylene oxide adduct. The invention may be further described as involving the inhibition of deposition of scale forming brines in an aqueous system such as but not limited to subsurface formations containing brine in which scale forming amounts of the water insoluble salts are present wherein there is added to the system through a well penetrating the subsurface formation a small but effective amount of the ester described supra.

One such ester has the following structure:

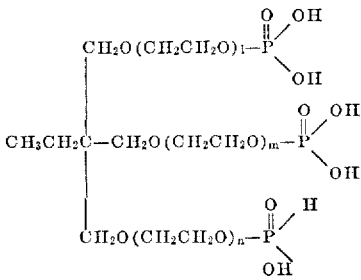

where the total moles of ethylene oxide incorporated (sum of $1+m+n$) is within the range from 2 to 50 but preferably is from 3 to 20, but more preferably is from 4 to 14. The alkali metal and ammonium salts, preferably monosodium salt, also forms part of the present invention. The other sodium and potassium salts may also be used.

VARIABLES OF THE INVENTION

The present invention effectively prevents the deposition of water insoluble salts from solutions containing them. The water insoluble salts include calcium sulfate, barium sulfate, calcium carbonate, strontium carbonate and strontium sulfate and other water insoluble materials such as the salts of iron and the like which may deposit from an aqueous system and plug conducts and lines and other flow media.

The triol employed in the practice of the present invention are preferably trimethylol propane, glycerin, 1,2, 4-butane triol, 1,2,6-trihydroxy-hexane, 2,5-dimethyl-1,2, 6-hexane triol, $\alpha^1,\alpha^3,\alpha^5$-trihydroxy-hexamethyl benzene, and the like. Other similar triols may be used.

The tri-orthophosphate ester of the present invention suitably contains 2 to 50 moles of ethylene oxide but may be the 3 to 20-mole ethylene oxide adduct, but preferably contains 4 to 14 moles of ethylene oxide as the adduct.

The amount of the inhibitor added to the aqueous system may vary from about 0.5 to 100 p.p.m., but preferably is in the range from about 2 to about 50 p.p.m. based on the total amount of the water which is to be treated.

DESCRIPTION OF THE PREFERRED MODE AND EMBODIMENT

The inhibitor of the present invention is prepared by the reaction of triol such as trimethylol propane with ethylene oxide and phosphoric acid to from the phosphate of an ethoxylated triol having the following structure:

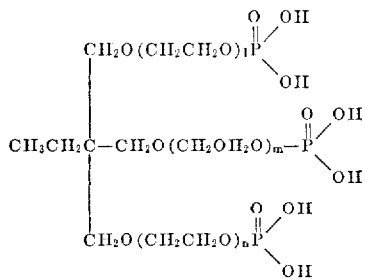

where the sum of $l+m+n$ is within the range from 2 to 50.

(1) ETHOXYLATION STEP 1250 pounds of trimethylol propane were charged to an ethoxylation unit. 20 pounds of NaOH catalyst were added and 4700 pounds of ethylene oxide was reacted with the reactor contents giving a 11.4 more adduct of trimethylol propane. The reaction temperature was maintained at 300–320 F. This ethoxylation was conducted in accordance with the following equation:

1. $CH_3CH_2C(CH_2OH)_3 + 3n\overset{O}{\overset{\triangle}{CH_2CH_2}} \longrightarrow$
   A     B $CH_3CH_2C[CH_2O(CH_2CH_2O)_nH]_3$
              C where n is from 2 to 20.

The compound referred to by the letter C is then reacted with phosphoric acid in accordance with Equation 2.

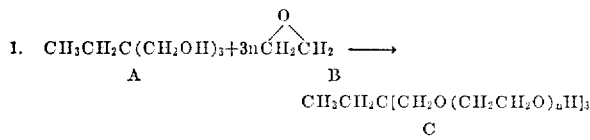

(2) ESTERIFICATION AND NEUTRALIZATION STEPS

An esterification reactor was charged with 4620 pounds (69.9 pound moles) of 115% polyphosphoric acid. Then 5750 pounds of ethoxylated trimethylol propane (Compound C) was added. A nitrogen purge was begun. The cooling water to the reactor coils was turned on and agitation begun. The exothermic reaction strated with the beginning of agitation. The reaction continued for 3 hours with the temperature being controlled between 200° and 252° F. When the reaction temperature had decreased to 225° F., 1900 gallons of water were added to the product along with 4800 pounds of NaOH, making an aqueous solution of the partially neutralized compound F as set out in the following equation:

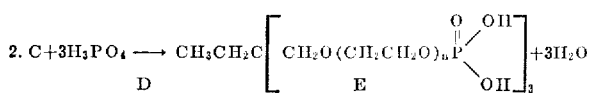

While compound E is an effective inhibitor in preventing deposition of water insoluble salts such as calcium sulfate and the like, it is a strong acid and it may be desirable and preferable to convert it to a salt form as shown in the immediately preceding equation. For example, in Equation 3 the compound ester is converted to the monosodium salt which is also an effective inhibitor for water insoluble salts such as "gyp."

To illustrate the effectiveness of Compound F as an inhibitor for calcium sulfate scale deposition, the acid form Compound F was added in various concentrations to solutions containing calcium sulfate scale as shown in the following Table A with the results indicated. The test procedure for this test is shown hereinafter.

TABLE A

| Inhibitor | Concentration, p.p.m. | Percent inhibition |
|---|---|---|
| Compound F acid form 50% active | 10 | 100 |
|  | 5 | 4 |
|  | 2½ | 8 |
| Compound F 40% active, neutralized to pH of 5 | 10 | 59 |
|  | 5 | 8 |
|  | 2½ | 5 |

It will be seen that both the acid and neutralized form of Compound F are effective scale inhibitors.

The inhibitors were then added to a brine solution containing 50 g./l. of sodium chloride and 500 p.p.m. of barium sulfate. The inhibitor was then added as the monosodium salt of Compound F in various concentrations to the solution mentioned supra with the results shown in Table B.

TABLE B

| Inhibitor | Concentration, p.p.m. | Results |
|---|---|---|
| Compound F | 50 | No ppt. after 2 hours. |
|  | 20 | Do. |
|  | 10 | Do. |
|  | 5 | Slight ppt. between 1 and 2 hours. |
| Blank | | Heavy ppt. within 30 seconds. |

In further illustration of the present invention, Compound G was tested as an inhibitor against deposition of calcium carbonate precipitation in a static test, the description of which is given hereinafter. The results of these tests are shown in Table C.

TABLE C.—INHIBITION OF CALCIUM CARBONATE PRECIPITATION

| Inhibitor | Concentration | Hardness as mg. CaCO₃ in 10 ml. sample | Percent Inhibition |
|---|---|---|---|
| Fresh blank | | 17.1 | |
| Compound G | 10 | 17.2 | 100.0 |
|  | 5 | 17.4 | 100.0 |
|  | 2½ | 17.0 | 97.5 |
| TKPP | 10 | 16.7 | 89.5 |
|  | 5 | 17.0 | 97.5 |
|  | 2½ | 16.7 | 89.5 |

NOTE.—Compound G is the monosodium salt of the triphosphate ester prepared from 6 moles of ethylene oxide added to trimethylol propane.

TKPP is tetrapotassium hyrophosphate ($K_4P_2O_7$). The data in the foregoing Table C show that Compound G is effective in preventing deposition of calcium carbonate and is as effective or better than tetrapotassium pyrophosphate in equal amounts. Another aspect of the present invention is that an improved ester may be prepared by reacting trimethylol propane with ethylene oxide at temperatures above 350° F. to form an ethoxylated triol in accordance with the following equation:

$$CH_3CH_2C(CH_2OH)_3 + nCH_2\overset{O}{\underset{}{\diagdown}}CH_2 \longrightarrow R(OH)_3$$
$$\quad A \qquad\qquad\qquad B \qquad\qquad O$$

Where $n=2$ to 50, but more preferably 4 to 15.

In such reaction the temperature may range from 350 to 425° F. The ethoxylated triol is then reacted with phosphoric acid to prepare a tri-orthophosphate ester in accordance with the following equation:

$$O + 3H_3PO_4 \longrightarrow R(O\overset{O}{\underset{OH}{\overset{|}{P}}}-OH)_3 + 3H_2O$$
$$\qquad P \qquad\qquad\qquad Q$$

The Compound Q is an effective inhibitor against precipitation of calcium sulfate. Since it is a strong acid and somewhat corrosive to carbon steel, Compound Q may be converted to a salt form by partial or complete neutralization with sodium hydroxide or other base in accordance with the following equation:

$$Q + 3NaOH \longrightarrow R(O\overset{O}{\underset{OH}{\overset{|}{P}}}-ONa)_3 + 3H_2O$$
$$\qquad\qquad\qquad J$$

In the several immediately foregoing equations R is the organic radical resulting from Compound A in the first of the immediately preceding equations.

It has been found that such compounds where there is some rearrangement at the high temperatures are improved inhibitors for "gyp" scale inhibition.

As a specific example of the rearranged compound, the ethoxylation reactor was charged with 6.8 moles of trimethylol propane and 5.0 g. of sodium hydroxide. The reactor was heated to 300° F. and ethylene oxide addition was begun. Over a period of two hours, 68 moles of ethylene oxide were added. The maximum reaction temperature was 390° F. while the pressure ranged from 85–95 p.s.i. The reactor was cooled and the product was recovered. The product is the rearranged 10 mole adduct of trimethylol propane. The ethoxylated trimethylol propane was then esterified with 115% phosphoric acid in which 0.24 mole of the rearranged ethoxylated trimethylol propane and 1.47 moles of 115% polyphosphoric acid were used. Stirring was begun and an exothermic reaction occurred which raised the temperature to 77° C. Heating was begun when the temperature began to fall, and the reaction temperature was maintained at 100° C. for 2 hours. The reaction product was a viscous amber liquid.

A portion of the phosphate ester was neutralized to a methyl orange end point with 8 N sodium hydroxide which corresponds to neutralization of one acidic hydrogen on each phosphate radical. The resulting product was diluted with additional water giving a product containing 40% nonvolatile material with a pH of 5.0.

Another portion of the same phosphate ester was neutralized with 8 N sodium hydroxide to a phenolphthalein end point. This corresponds to the neutralization of both acidic hydrogens of each phosphate radical.

As another example of the present invention, a test solution was made up containing 100 g. NaCl, 21.9 g. $CaCl_2 \cdot 2H_2O$ and 10.15 g. $MgCl_2 \cdot 6H_2O$ diluted to 1 liter with distilled water. A 50 ml. aliquot of the test solution was placed in 6 oz. prescription bottles along with sufficient inhibitor to yield the desired inhibitor concentration. A 5 ml. sample of 1.25 M $Na_2SO_4$ was then added to each bottle and the contents shaken vigorously to mix thoroughly. The bottles were allowed to stand undisturbed for 24 hours. At the end of this period, a sample from each bottle was titrated for residual hardness. The inhibition of precipitation was calculated by the following equation:

Percent inhibition $$= \frac{\text{hardness in sample} - \text{hardness in blank}}{\text{hardness in fresh blank} - \text{hardness in blank}}$$

Further description of the test method is given hereinafter. The results of this test are shown in Table D.

TABLE D

| Inhibitor | Concentration, p.p.m. | Ml. to titrate 2 ml. sample | Percent inhibition |
|---|---|---|---|
| Fresh blank | | 36.6 | 100.0 |
| Blank | | 21.8 | 0.0 |
| Compound Q | 10 | 36.5 | 99.5 |
| Do | 5 | 29.5 | 52.4 |
| Do | 2½ | 24.2 | 16.3 |
| Mono Na salt of Compound Q | 10 | 35.6 | 93.2 |
| | 5 | 26.5 | 32.0 |
| | 2½ | 23.5 | 11.6 |
| Di K salt of Compound Q | 10 | 36.3 | 98.0 |
| | 5 | 26.3 | 32.0 |
| | 2½ | 24.3 | 17.0 |

Compound Q is the inhibitor prepared by reacting the rearranged 10 mole ethylene oxide adduct of trimethylol propane with phosphoric acid.

Mono Na Salt is Compound Q neutralized with NaOH to a pH of 4–5.

Di K Salt is Compound Q neutralized with KOH to a pH of 8–9.

From the data in Table D, it is apparent that the compounds described are extremely effective in small amounts in preventing the crystallization of calcium sulfate.

To illustrate the effect of the ethylene oxide content on inhibition of calcium sulfate scale, the data in Table I are presented.

TABLE I.—CALCIUM SULFATE SCALE INHIBITION AS A FUNCTION OF ETHYLENE OXIDE CONTENT

| | Moles EO [2] | Conc., p.p.m. | Percent Inhibition |
|---|---|---|---|
| Compound: [1] | | | |
| G | 6 | 5 | 75.2 |
| | | 10 | 91.4 |
| | | 50 | 93.0 |
| H | 10 | 5 | 78.6 |
| | | 10 | 97.2 |
| | | 50 | 100.0 |
| K | 14 | 5 | 68.8 |
| | | 10 | 93.5 |
| | | 50 | 92.2 |

[1] All compounds were tested as the monosodium salts (pH≅4.5) at ambient temperature of 75° F. for 20 hours.
[2] Ethylene oxide.

Compounds G, H and K were prepared similarly to Compound F except that different amounts of ethylene oxide were used.

From these data it will be seen that effective inhibition is obtained from 6 to 14 moles of ethylene oxide. It is to be specifically noted that at 10 moles ethylene oxide the effectiveness is greater than at lower amounts of ethylene oxide.

The tests reported in Table I were conducted at 75° F. To show that the inhibition is effective at high temperatures, other operations were conducted at both 75° and 150° F. and these data are reported in Table II.

TABLE II.—HIGH TEMPERATURE TEST FOR CALCIUM SULFATE INHIBITION

| | | Percent | |
|---|---|---|---|
| Inhibitor | Conc., p.p.m. | Inhibition [1] at 150° F. | Inhibition [2] at room temp. |
| Compound F | 8 | 31.8 | 100 |
| | 4 | 16.2 | 55.8 |

[1] Samples run 4 hours at 150° F. in oven using standard test solution.
[2] Samples run 24 hours at 75° F. (normal conditions).

It will be seen from Table II that inhibition is effective at 150° F. as well as at 75° F., although there is some lowering of effect at the high temperature.

The inhibition of calcium carbonate deposition is also a function of ethylene oxide content as shown in the data in Table III.

TABLE III.—CALCIUM CARBONATE SCALE INHIBITION AS A FUNCTION OF ETHYLENE OXIDE CONTENT [1]

| Compound: | Moles EO | Conc., p.p.m. | Percent inhibition |
|---|---|---|---|
| H | 10 | 8 | 32.8 |
|  |  | 4 | 19.0 |
|  |  | 2 | 15.5 |
| G | 6 | 8 | 63.0 |
|  |  | 4 | 50.0 |
|  |  | 2 | 32.5 |
| L | 4 | 8 | 51.8 |
|  |  | 4 | 50.0 |
|  |  | 2 | 38.0 |

[1] Compounds H, G, and L were prepared similarly to Compound F except different amounts of ethylene oxide were used.

As shown in the data in Table III, more effective results were obtained at 6 moles of ethylene oxide than with greater or lesser amounts with respect to calcium carbonate.

To further illustrate the present invention, the results of dynamic tests for calcium carbonate scale inhibition at various concentration levels are shown in Table IV.

TABLE IV.—RESULTS OF DYNAMIC TESTS FOR CALCIUM CARBONATE SCALE INHIBITION

| Conc., p.p.m.: | Percent inhibition by— | | | |
|---|---|---|---|---|
|  | G | H | L | TKPP [1] |
| 1.25 | 73.5 | 87.1 | 83.5 | [2] 91.7(2) |
| 2.0 | 91.7(2) |  |  |  |
| 2.5 | 99.5(2) | 88.4 | 99.2 |  |
| 4.0 | 98.6(2) |  |  |  |

[1] Tetrapotassium pyrophosphate.
[2] Number in parentheses indicates number of duplicate runs.

It will be seen that not only are the inhibitors of the present invention effective in static tests but also in dynamic tests.

To show that inhibitors of the present invention are not corrosive, various concentrations of it against carbon steel are shown in Table V.

TABLE V

Corrosiveness of scale inhibitors—Compound F

| Concentration, p.p.m.: | Wt. loss, mg.[1] |
|---|---|
| 10 | 1.9 |
| 100 | 2.8 |
| 1000 | 4.6 |
| 10,000 | 4.0 |
| 100,000 | 6.3 |
| Blank | 1.4 |

[1] Wt. loss carbon steel specimen immersed 24 hours at 180° F., nitrogen blanket, in 10% NaCl-1% CaCl₂ brine. Average of 4 runs.

It will be noted that below concentrations at 100 p.p.m., the inhibitor of the present invention is only slightly more corrosive than the blank.

The present invention has also been demonstrated in commercial operations as shown in Table VI where the effect on cleanup and squeeze in oil well production for two wells are given.

TABLE VI.—EFFECT OF CLEANUP AND SQUEEZE UPON OIL WELL PRODUCTION

| Well | Well X | Well Y |
|---|---|---|
| Before squeeze: |  |  |
| Oil, bbls | 14 | 8 |
| Fluid, bbls | 14 | 9 |
| After squeeze:[1] |  |  |
| Oil, bbls | 80 | 37 |
| Fluid, bbls | 142 | 59 |
| Compound F,[2] p.p.m | 15 | 36 |
| Production increase: |  |  |
| Oil, bbls | 66 | 29 |
| Fluid, bbls | 128 | 50 |

[1] Production data average for month beginning 2 weeks after squeeze.
[2] Wells sampled 75 days since squeezed.

It will be clear that the increase in production of oil comparing before and after treatment of the present invention is remarkable. Not only is this a surprise and an unobvious increase in production, but it is an economic gain since heretofore wells which had begun production and no longer produced now produce oil in economic quantities.

A field test for barium sulfate inhibits was conducted in which Compound F was used with continuous treatment to control barium sulfate scale in a well in California. The test was successful and the well produced for 57 days with only very light scaling. The previous history of this well showed that it averaged about 40 days between each pulling job, even with treatment with commercially available inhibitors in order to remove scale deposits from the pump and tubing. The problem was strictly barium sulfate scale depositing in the well. Compound F at 25 p.p.m. was used to replace the previous inhibitor. After being on test for 57 days as mentioned supra, the well was pulled because of mechanical problems. In any event, only slight scaling was noted and a 42 percent longer production period was obtained without any decline in production.

In another operation in Texas, Compound G was used for calcium carbonate scale inhibition in an oil field. The operation was continuous over a period of nearly two months and was quite successful in controlling calcium carbonate scale deposits. In comparison with other inhibitors, Compound G showed a remarkable advantage.

In order to illustrate that other triols may be used in preparing inhibitors for water insoluble salts such as calcium sulfate scale and calcium carbonate scale, the monosodium salt of the triphosphate ester of 8 mole ethylene oxide adduct of glycerin was prepared as described hereinbefore and the results are shown in Table VII.

TABLE VII

Inhibition by the Monosodium Salt of the Triphosphate Ester of 8 Mole Ethylene Oxide Adduct of Glycerin Calcium sulfate scale

| Inhibitor concentration, p.p.m.: | Percent inhibition |
|---|---|
| 4 p.p.m. | 24 |
| 8 p.p.m. | 94 |

Calcium carbonate scale

| Inhibitor concentration, p.p.m.: | Percent inhibition |
|---|---|
| 4 p.p.m. | 62 |
| 8 p.p.m. | 62 |

This reaction product of glycerin was in the form of the monosodium salt. It will be seen from the foregoing data that the monosodium salt of the triphosphate ester of 8 mole ethylene oxide adduct is also quite effective in inhibiting scale formation from solutions containing water insoluble salts.

The static test method for calcium carbonate scale inhibition may be described as follows:

Static tests for calcium carbonate inhibition were carried out using a synthetic brine. The tests were done in 6-ounce prescription bottles. The samples on test were heated in an air oven at 160° F. for 20 hours in order to increase the severity of the test. At the end of the heating period, and aliquot from the test solution was titrated for hardness using the standard ethylene diamine tetra-acetic acid hardness titration. The percent inhibition was calculated by the following formula:

Percent inhibition $$= \frac{\text{Sample hardness} - \text{blank hardness}}{\text{Fresh blank hardness} - \text{blank hardness}} \times 100$$

The test solutions which were used were made up as follows:

Solution A:
160 grams (2.74 moles) NaCl
2.0 grams (0.027 mole) $CaCl_2$ (anhydrous)
1.32 grams (0.0044 mole) $MgCl_2 \cdot 6H_2O$ These salts were dissolved in water and diluted to 1 liter.

Solution B: 2.0 grams (0.024 mole) $NaHCO_3$

The sodium bicarbonate was dissolved in water and diluted to 1 liter.

In carrying out a test, 50 ml. of Solution A were placed in a 6-ounce prescription bottle along with the desired amount of inhibitor. Fifty milliliters of Solution B were then added to the bottle, the bottle shaken well and placed in an oven maintained at 160° F. for 20 hours. At the end of this period, the residual hardness was determined using an aliquot and the percent inhibition calculated by comparing the performance of the inhibited sample with the performance of an uninhibited sample.

The hardness was determined by the ethylene diamine tetra-acetic acid hardness titration procedure.

The dynamic test method for calcium carbonate scale inhibition is described below:

The dynamic test for calcium carbonate scale inhibition involved pumping 50 gallons of water through a vessel heated by a 750-w. electrical heater. Scale deposition was measured by determining the weight gain of the heater.

The test was run for approximately 18 hours at a temperature of 150° F. Under these conditions a blank run caused about 15½ grams of calcium carbonate scale to be deposited upon the heater.

The test solution was made as follows: 15,100 grams of $CaCl_2 \cdot 2H_2O$ were placed in an open-head coated drum. Sufficient tap water was added (about 40 gallons) to dissolve the salt in the drum. A second solution containing 191.0 grams of $NaHCO_3$ dissolved in about one gallon of water was added to the solution in the barrel with considerable agitation. After thoroughly mixing, sufficient water was added to bring the volume of the solution in the drum to 50 gallons.

The pump and the heater were then turned on and adjusted to the proper levels. The rate of flow was controlled at three gallons/hour using a rotameter. The temperature was controlled at 150+5−0° F. with a temperature controller. When the drum was empty, the heater was removed from the vessel, washed with distilled water and acetone and dried to constant weight. The heater which was used was a 750-w. hairpin heater which had been cleaned so as to leave a bright copper surface.

The calcium sulfate scale inhibition test was determined in accordance with the following:

The following test was used to screen inhibitors for calcium sulfate scale inhibition.

Two solutions were made up:

Solution 1:
200 g. NaCl
43.8 g. $CaCl_2 \cdot 2H_2O$, USP grade
20.3 g. $MgCl_2 \cdot 6H_2O$, AR grade
Dissolve in distilled water, dilute to 2 liters.

Solution 2:
177.5 g. $Na_2SO_4$ (anhydrous)
Dissolve in distilled water, dilute to 1 liter.

Place 50 ml. of Solution 1 in a 6 oz. prescription bottle. Add the desired amount of inhibitor (normally, 5, 10, 20 and 40 p.p.m.) and mix well. Then add 5.0 ml. of Solution 2 to the bottle. Mix well by shaking.

Allow the bottles to stand 24 hours, then titrate the residual hardness in a 2 ml. aliquot. The hardness titration is carried out using ethylene diamine tetra-acetic acid solution and hardness indicator.

Calculate the percent inhibitor by the following formula:

$$\text{Percent inhibition} = \frac{\text{ml. to titrate sample} - \text{blank}}{\text{fresh blank} - \text{blank}} \times 100$$

The severity of the test can be increased by placing the bottles in an oven maintained at an elevated temperature such as 150° F. for several hours.

The present invention is quite advantageous and useful as illustrated by the numerous examples. In fact, the economic gain from using inhibitors in current oil production has made productive fields which heretofore were not productive.

The nature and objects of the present invention having been completely described and illustrated and the best mode and embodiment contemplated set forth, what I wish to claim as new and useful and secure by Letters Patent is:

1. Triorthophosphate ester of a 2 to 50 mole ethylene oxide adduct of a triol selected from the group consisting of trimethylol propane, glycerin, 1,2,4-butane triol, 1,2,6-trihydroxy - hexane, 2,5-dimethyl-1,2,6-hexane-triol and $\alpha^1,\alpha^3,\alpha^5$-trihydroxy-hexamethyl benzene.
2. The ester of claim 1 in which the triol is glycerin.
3. The alkali metal salts of the ester of claim 1.
4. The ammonium salts of the ester of claim 1.
5. The monosodium salt of the ester of claim 1.
6. Triorthophosphate ester of a 3 to 20 mole ethylene oxide adduct of a triol selected from the group consisting of trimethylol propane, glycerin, 1,2,4-butane triol, 1,2,6-trihydroxy-hexane, 2,5-dimethyl, 1,2,6-hexane triol and $\alpha^1,\alpha^3,\alpha^5$, trihydroxy-hexamethyl benzene.
7. The compound

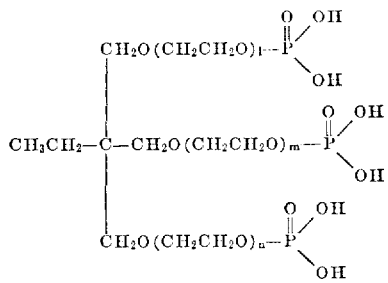

where the sum of $l+m+n$ is from 2 to 50.

8. A compound in accordance with claim 7 wherein the sum of $l+m+n$ is from 3 to 20.
9. A compound in accordance with claim 7 wherein the sum of $l+m+n$ is from 4 to 14.
10. A compound in accordance with claim 7 wherein the sum of $l+m+n$ is 10.
11. A compound in accordance with claim 7 wherein the sum of $l+m+n$ is 6.
12. The compound

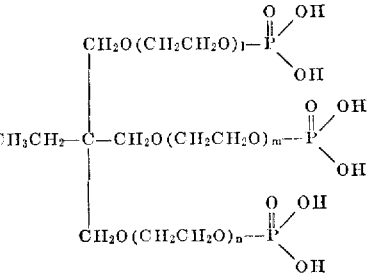

where the sum of $l+m+n$ is from 2 to 50.

13. A compound in accordance with claim 12 wherein the sum of $l+m+n$ is from 3 to 20.

14. A compound in accordance with claim 12 wherein the sum of $l+m+n$ is from 4 to 14.

15. A compound in accordance with claim 12 wherein the sum of $l+m+n$ is 10.

16. A compound in accordance with claim 12 wherein the sum of $l+m+n$ is 6.

17. The monosodium salt of the triorthophosphate ester of a glycerin-ethylene oxide adduct, wherein said adduct contains about eight moles of ethylene oxide per mole of glycerin.

References Cited

UNITED STATES PATENTS 3,291,867   12/1966   Shew et al. _____ 260—929 X

CHARLES B. PARKER, Primary Examiner

A. H. SUTTO, Assistant Examiner

U.S. Cl. X.R.

252—8.5 C, 80, 175; 260—978

UNITED STATES PATENT OFFICE
CERTIFICATE OF CORRECTION

Patent No. 3,636,142                    Dated January 18, 1972

Inventor(s) William G. DePierri, Jr.

It is certified that error appears in the above-identified patent and that said Letters Patent are hereby corrected as shown below:

Rewrite claim 12 as follows

-- 12. The compound

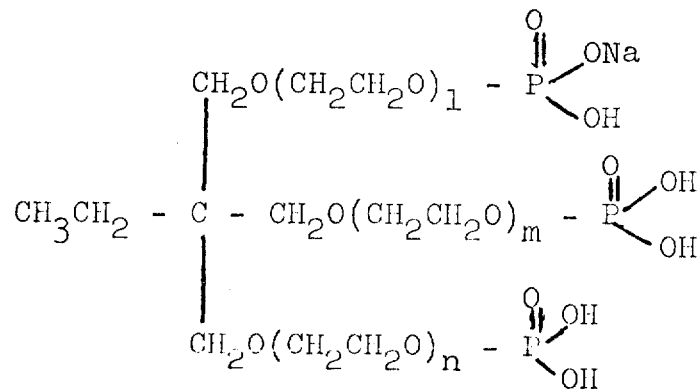

where the sum of l+m+n is from 2 to 50.

Signed and sealed this 21st day of November 1972.

(SEAL)
Attest:

EDWARD M. FLETCHER, JR.
Attesting Officer

ROBERT GOTTSCHALK
Commissioner of Patents